No. 607,939. Patented July 26, 1898.
B. F. MAYO.
NAIL ASSORTING MECHANISM.
(Application filed Aug. 24, 1897.)
(No Model.)
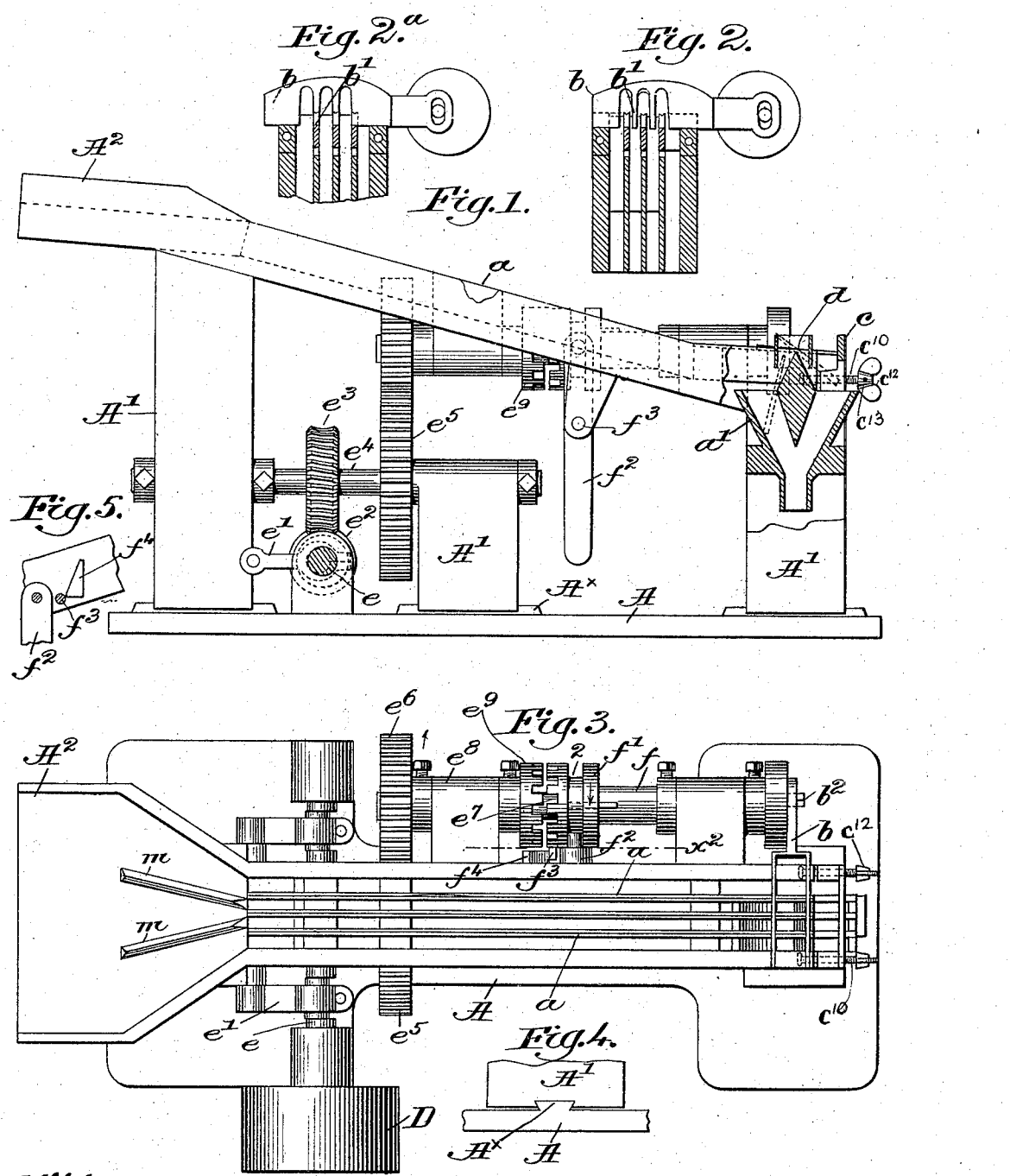
Witnesses:
A. C. Harmon
Thomas J. Drummond
Inventor:
Benjamin F. Mayo.
by Crosby Gregory
attys

UNITED STATES PATENT OFFICE.

BENJAMIN F. MAYO, OF SALEM, MASSACHUSETTS, ASSIGNOR TO JAMES W. BROOKS, OF PETERSHAM, AND JOHN BROOKS, OF CAMBRIDGE, TRUSTEES FOR THE McKAY-BIGELOW HEELING MACHINE ASSOCIATION, OF BOSTON, MASSACHUSETTS.

NAIL-ASSORTING MECHANISM.

SPECIFICATION forming part of Letters Patent No. 607,939, dated July 26, 1898.

Application filed August 24, 1897. Serial No. 649,319. (No model.)

*To all whom it may concern:*

Be it known that I, BENJAMIN F. MAYO, of Salem, county of Essex, State of Massachusetts, have invented an Improvement in Nail-Assorting Mechanism, of which the following description, in connection with the accompanying drawings, is a specification, like letters and figures on the drawings representing like parts.

This invention has for its object the production of novel nail-assorting mechanism wherein provision is made for delivering the nails in the desired directions as to their heads and points.

In my invention I employ a series of nail-guideways on which the nails are stopped uniformly, and at the sides of the guideways I have located pockets to receive the nails, said nails being transferred laterally from said guideways into said pockets, from which they may be conducted in any usual manner into the nail-block or other usual or suitable receptacle to receive the arrested nails, to be subsequently driven therefrom.

I believe that I am the first to sustain a nail substantially throughout its length on a raceway and to then discharge it bodily laterally from the raceway into a pocket located at the side of the raceway, the nails being then guided into driving position, and hence the invention herein contained is not intended to be limited to the exact mechanical device shown for discharging the nail from the raceway that it may enter the pocket, for it will be readily understood that the construction of such a device may be variously modified by only the skill of the mechanic and without invention.

Figure 1, in side elevation, represents a sufficient portion of a nail-assorting mechanism to enable my invention to be understood. Fig. 2 is a partial section chiefly to show the form of transferrer which I have herein chosen to illustrate. Fig. 2ª shows said transferrer in a different position. Fig. 3 is a top or plan view of the parts shown in Fig. 1, and Fig. 4 shows one of the legs A and its guide. Fig. 5 is a detail showing part of the side frame of the raceway and its cam $f^4$ and the pin $f^3$, the view being a section on the line $x^2$, looking toward the side frame.

The framework A, of suitable shape to sustain the working parts, has mounted on or above it suitable legs A', sliding on guides A$^\times$ of the framework, said legs supporting the hopper A$^2$, the latter having communicating with or leading from its lower end a plurality of raceways $a$, said raceways being shown as narrow bars grooved at their upper edges to receive and guide the nails to be sorted, said nails in the instance of my invention herein shown passing down said raceways either end first. At the sides of said raceways, just above their lower ends and between the same, I have provided a series of pockets $a'$, said pockets being suitably connected with and leading to any usual or suitable nail block or receptacle from which the sorted nails are to be taken for use. These raceways have co-operating with them a transferrer $b$, a device preferably relatively laterally movable with relation to the raceways, whereby a nail duly arrested at a definite point on the raceway may by or through this lateral relative movement be transferred or moved laterally with relation to the length of said raceways and be dropped into said pockets.

The transferrer which I have herein chosen to illustrate as embodying one suitable form of my invention is composed of a bar having a series of depending lugs or fingers $b'$, said lugs or fingers in the movement of the transferrer transversely to the length of the raceways by or through a suitable crank-pin $b^2$ or other actuator contacting with the sides of the nails resting on the tops of the raceways and pushing them bodily laterally from said raceways, letting them fall into said pockets, and for the best and most satisfactory results I have made said lugs or fingers long enough to enter transverse slots made in said raceways; but they might, but not so well, terminate closely to the tops of the raceways. The transferrers herein shown serve also another function—viz., the function of stops to arrest the nail next behind the nail being acted upon by the transferrer to be removed from the raceway, said lugs or fingers stopping in their discharging movement immediately in line with the grooves of the raceways, to thereby permit the next nail back, as described, to meet said lugs or fingers and be stopped until said transferrer is returned into its normal position, at which time the nails so stopped are released and permitted to further descend on the raceway to the main stop $c$, the stop for the endmost nails of the raceways to be discharged. This stop $c$ traverses the set of raceways at or near their lower ends and is made adjustable toward and from said raceways in the direction of their length, to thereby so position the nails with relation to a selecting or balancing device $d$ that the upper edge of said balancing device will lie substantially equidistant between the heads and points of the individual nails. The stop $c$ receives in it the threaded shank of two bolts or adjusting-screws $c^{10}$, having their head ends mounted loosely in or with relation to the framework A, the threaded parts of said bolts having fixed upon them suitable thumb-pieces $c^{12}$, so that by engaging said thumb-pieces the screws may be turned, the thread of the screw moving the stop $c$ back and forth with relation to the ends of the raceways. The thumb-piece may be fixed, as by a pin $c^{13}$. (Shown in Fig. 1.) These balancing devices occupy a position between the raceways referred to and cross over and in a measure divide the pockets referred to, so that the nails transferred laterally from said raceways to drop into said pockets will strike said balancing devices, and owing to the fact that the heads of the nails are the heavier said heavy ends will turn down quickly and consequently all the nails so discharged from said raceways, whether point or head first, indiscriminately will enter said pockets head first.

To better insure the effective operation of the mechanism herein described I have given to the raceways a certain pitch or inclination down substantially to one nail's length from the point where the transferrer stands, and from that end of the part of greatest inclination to substantially the end stop $c$ the raceway is as nearly horizontal as it may be made and yet insure the nails traveling thereon by the force of gravity, the placing of part of the raceway more nearly horizontal, as stated, requiring less motion on the part of a nail having its point first and pushed onto the balancing device to start it falling in the proper direction. The travel of the nails downwardly on the said raceways may, however, be aided by any suitable or usual shaking or jarring motion common to this class of mechanism, I having herein shown for such purpose a crank-shaft $e$, carrying links $e'$, attached to legs A', the motion of the crank-shaft reciprocating to a slight extent said legs and their attached parts. This crank-shaft $e$ derives its motion from a suitable belt on a belt-pulley D. The shaft $e$ has a worm $e^2$, which engages and rotates a worm-toothed gear $e^3$, fast on a shaft $e^4$, provided with a toothed gear $e^5$, in mesh with a pinion $e^6$, fast on a shaft $e^7$, said shaft, in suitable bearings $e^8$, having fast on it a clutch $e^9$, it being herein shown as toothed. The end of shaft $e^7$, as herein represented, enters a hole in one end of a second shaft $f$, substantially in line with it, this latter shaft having loosely splined on it a clutch $f'$, having an annular groove 2, which is engaged by a shipper-lever $f^2$, pivoted at $f^3$, said shipper-lever being acted upon at suitable times by hand, as whenever the shaft $f$ is to be given one full rotation to actuate the transferrer to discharge a series of nails from the raceways and then to return it to its normal position. Normally the clutch referred to is out of engagement, and it is put into engagement at the proper times manually; but it must be disconnected automatically, and to do this I have in this present instance of my invention provided the clutch $f'$ with a lug $f^3$, (see Fig. 3,) which acts at the end of each rotation of said clutch against a suitable cam projection $f^4$, represented as fixed on the movable framework carrying the raceways, the shape of said cam projection being shown separately in Fig. 5.

The stop $c$ may be adjusted to adapt it to any suitable length of nail, to thereby position the stop, so that the balancing device will come to the center of the length of the nail.

This invention, as has been stated, is not limited to the exact construction shown for the transferrer, nor to the means exhibited for actuating it, and instead any usual or suitable devices for reciprocating the same may be employed.

I have herein shown the transferrer as a U-shaped or forked bar, each branch of the bar having like lugs or fingers, these two series of lugs or fingers acting to carry the nail bodily and evenly off of the raceways; but my invention will not be departed from if the said transferrer is composed of but one bar; but in such case the lugs or fingers would have to act centrally with relation to the length of the nail.

The bottom of the hopper $A^2$ may be provided with suitable raised inclined lips or projections $m$, which come opposite the spaces between the raceways $a$, the bottom of the hopper exposed between the said projections being substantially in line with the upper guiding edge of the raceways, so that nails entering the spaces between the ridges $m$ are directed properly onto the grooved tops of the raceways.

The legs A', supporting the operating parts thus far described, slide on suitable guides $A^\times$, fixed to the bed A, as the crank-shaft $e$ is rotated.

Having fully described my invention, what I claim, and desire to secure by Letters Patent, is—

1. In a nail-assorting mechanism, a series of raceways, adapted to receive upon them and sustain, the entire length of the nails, and pockets arranged at the sides of said raceways, combined with a transferrer adapted to meet the sides of a series of nails and push the same laterally from the said raceways, said nails dropping into said pockets, substantially as described.

2. In a nail-assorting mechanism, a series of raceways, and pockets arranged at the sides of said raceways, combined with a transferrer adapted to meet the sides of a series of nails and push the same laterally from the said raceways, said nails entering said pockets, and a balancing device coöperating with each pocket, substantially as described.

3. In a nail-assorting mechanism, a series of raceways, adapted to receive upon them and sustain, the entire length of the nails, pockets at the sides of said raceways, and a stop for the leading end of the endmost nails on said raceways, combined with a transferrer adapted to meet the sides of a series of nails and push the same laterally from the said raceways, said nails dropping into said pockets, substantially as described.

4. In a nail-assorting mechanism, a series of raceways having extensions of lesser inclination, a series of pockets, and balancing devices, combined with transferring mechanism, to operate, substantially as described.

5. A series of raceways having transverse grooves, a stop at the ends of said raceways to stop the endmost nails, combined with a transferrer entering said grooves, and means to actuate said transferrer to push said nails from said raceways laterally, substantially as described.

6. A series of raceways to receive and guide a series of nails, a series of pockets at the sides of said raceways, combined with a two-armed transferrer having lugs or fingers to contact with the side of each nail to be transferred at two points, substantially as described.

In testimony whereof I have signed my name to this specification in the presence of two subscribing witnesses.

BENJAMIN F. MAYO.

Witnesses:
GEO. W. GREGORY,
EMMA J. BENNETT.